Feb. 18, 1964  V. J. GILBERT  3,121,570
INFLATABLE SEAL

Filed Sept. 29, 1961  5 Sheets-Sheet 1

INVENTOR.
VERNON J. GILBERT
BY William D. Carothers
HIS ATTORNEY

INVENTOR.
VERNON J. GILBERT
BY William D. Carothers
HIS ATTORNEY

Feb. 18, 1964 V. J. GILBERT 3,121,570
INFLATABLE SEAL
Filed Sept. 29, 1961 5 Sheets-Sheet 3

INVENTOR.
VERNON J. GILBERT
BY
William D. Carothers
HIS ATTORNEY

Feb. 18, 1964 V. J. GILBERT 3,121,570
INFLATABLE SEAL

Filed Sept. 29, 1961 5 Sheets-Sheet 4

INVENTOR.
VERNON J. GILBERT
BY
HIS ATTORNEY

Feb. 18, 1964 V. J. GILBERT 3,121,570
INFLATABLE SEAL
Filed Sept. 29, 1961 5 Sheets-Sheet 5
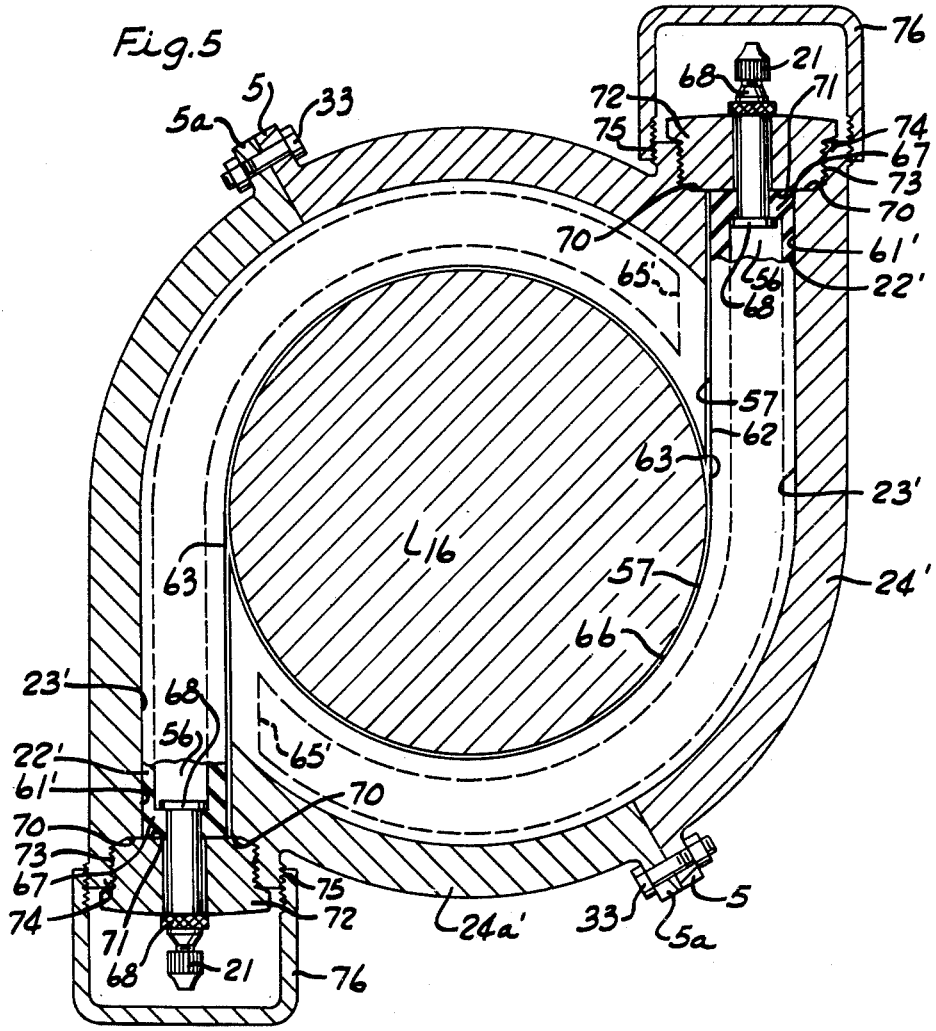
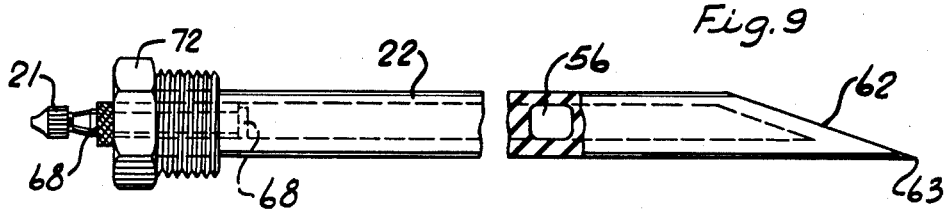
INVENTOR.
VERNON J. GILBERT
BY
William D. Carothers
HIS ATTORNEY

United States Patent Office 3,121,570
Patented Feb. 18, 1964

3,121,570
INFLATABLE SEAL
Vernon J. Gilbert, Indiana, Pa., assignor, by mesne assignments, to Link-Belt Company, Chicago, Ill., a corporation of Illinois
Filed Sept. 29, 1961, Ser. No. 141,718
9 Claims. (Cl. 277—34)

This invention relates generally to shaft seals and more particularly to inflatable seals for use on propeller shafts of ocean going craft.

Inflatable propeller shaft seals are used as standby seals for the purpose of obtaining a short time seal on the propeller shaft while the principal seal is being replaced. However, it is with considerable difficulty that these inflatable standby seals can be renewed. The ship must be placed in dry dock to relieve the pressure on the seal chamber of the inflatable seal before the housing can be opened up to remove and replace the worn or punctured inflatable seal.

The principal object of this invention is the provision of a new and novel inflatable shaft seal which seal may be installed while the ship is underway.

Another object is the provision of an inflatable seal for propeller shafts which is constructed of expansible material made from a continuous tube or from short straight seals. When made from a continuous elastomer the seal is cut into lengths and slit to close diagonally and provided with an enlarged cylindrical head at its other end with a valve therein. With this construction the elongated tubular seal may be inserted through a tangential opening leading into an inwardly open annular seal chamber and it is then fed around the seal chamber until the diagonal end engages its own tangential portion thus forming a stop. A gland member which is preferably tapered to tightly wedge the cylindrical head of the seal in the mouth of the tangential opening is tightly secured to seal and hold the same.

The annular walls of the seal chamber are undercut on one or both sides to support a portion of the elastomer seal or the chamber is provided with an annular slot on one or both sides to receive an elastomer or steel flange secured to the elastomer seal. The offset or the flanges retain the elastomer seal within the inwardly open annular chamber and out of contact with the rotary shaft. When the seal is to be employed it is inflated which deforms the seal and allows its inner annular surface to have sealing engagement with the shaft and tightly seal in the annular chamber. This seal can be inserted under pressure as the inwardly open chamber will guide the elastomer seal even though there is some leakage of water through the tangential opening through which the seal is inserted.

The walls of the elastomer seals are sufficiently resilient so that they will readily deform to first expand and seal in the annular chamber and deform to extend the annular seal into engagement with the shaft. The elastomer that is held by an undercut chamber may have the chamber undercut to an amount equal to the thickness of the wall of the elastomer.

Again the elastomer wall of the seal is preferably provided with a heavier tread for engagement with the rotary shaft. This provides an excellent support for different types of facing for sealing with the rotary shaft. Such facing may be graphitized or provided with superior wearing surface for engagement with the rotary shaft without undue wear and thus provide a permanent seal rather than a mere standby seal.

Again the inflatable seal walls may be tapered, being thin against the inner chamber wall where it is quick to expand and fill the same to seal the complete chamber and thereafter deform progressively along its tapered cross section to expand the inner annular sealing face against itself at its tapered end and against the rotary shaft.

Again these seals may be substantially circular in cross section, or rectangular in cross section or have an oval cross section. The different forms have better applications for different classes or ships, such as fast passenger vessels, freighters, warships and submarines.

The cylindrical heads with their valves are readily vulcanized in place. The holding flange or flanges may also be molded or extruded integrally or vulcanized to the body. This is also true of a metal flange which is vulcanized to the back of the seal and which may or may not be coated with rubber.

Elastomers such as rubber or synthetic plastic materials are ideal for this character of inflatable seal. The fact that they can be extruded, molded or otherwise formed in making this elongated tubular member adds materially to its simplicity and economic production. The shoe or shaft engaging surface may be shaped and fitted to provide the most advantageous form to produce the best result.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a sectional view showing the seal comprising this invention as applied to the propeller shaft of a ship, submarine or the like.

FIG. 5 is a transverse sectional view of a plurality of inflatable packing seals.

FIG. 9 is a view in side elevation of the inflatable packing seal as a free body.

Figure 1:
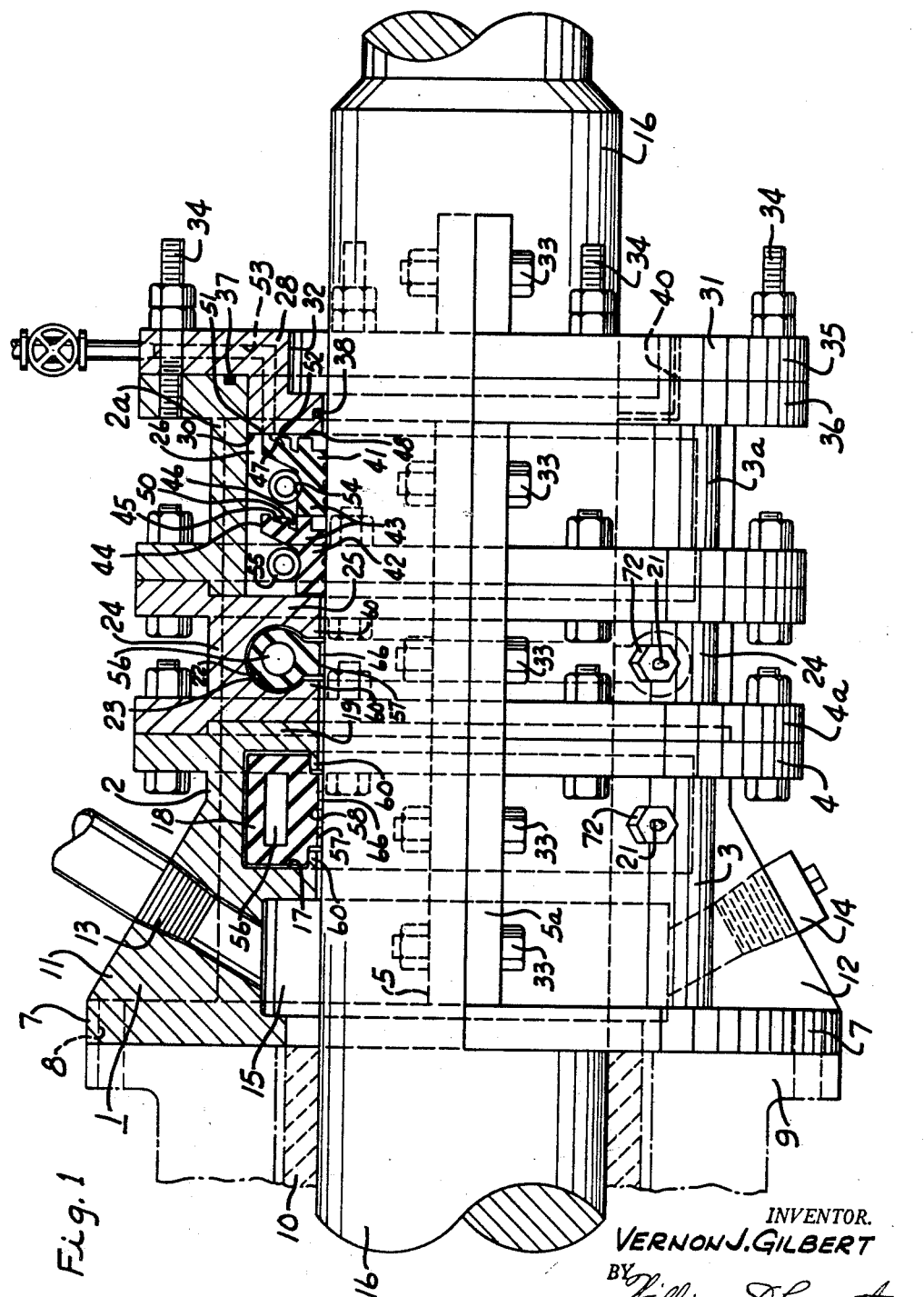
Figure 2:
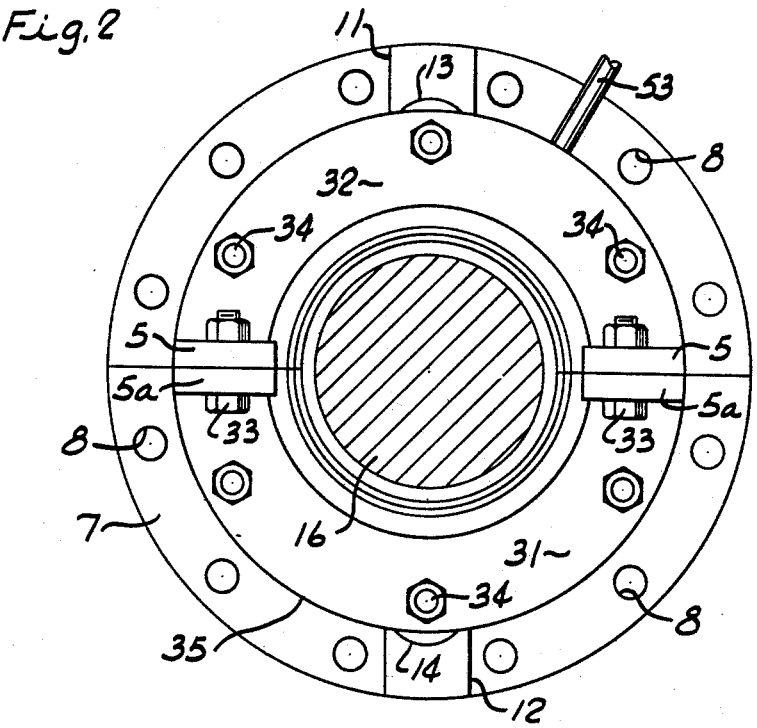
FIG. 2 is an end view of the housing showing the propeller shaft in section.

Referring to FIGS. 1 and 2 of the drawings, the split housing 1 is made in upper and lower halves 2, 2a and 3, 3a being split along the vertical plane and having the flanges 4 and 4a and split along the horizontal plane and having the radial flanges 5 and 5a which when bolted together form the completed housing.

The end of the housing is provided with the flange halves 7 which form an annular flange having a series of holes 8 passing therethrough for securing the housing to the hull of a ship or to the end of the closure or housing 9, enclosing the tail shaft bearing 10 as shown in FIG. 1. The flange 7 is backed up by the upper and lower angular brace members 11 and 12 which are each provided with threaded openings 13 and 14 that open into the interior chamber 15 of the split housing having a bore that surrounds the annular body member or propeller shaft 16. The annular body member which has been chosen to illustrate this invention is the propeller shaft but it may well be a tube, a piston rod, or other character of movable member extending from the closure 9. The upper threaded opening 13 is supplied with clean sea water under pressure for lubricating the tail shaft bearing 10 that produces positive and continued flow out through the tail shaft bearing and the stern tube of the ship. This functions to keep the bearing clean. Fresh water or water having been treated to remove any foreign substances or suspended substances in this tail bearing provides longer life for the bearing and shaft. The lower opening 14 is used as a drain or blowout for the chamber 15.

The halves of the split housing 1 form an annular chamber or recess 17 for receiving the inflatable sealing member 18 which is made in one continuous piece 20. The expandable seal has one valve stem mounting member 21, the stem of which extends tangentially from the annular chamber or recess. When not in service the sealing bore of this inflatable seal remains in spaced relation from the shaft 16.

Each standby seal section is hollow for receiving fluid under pressure, such as water, oil, gas or air that may be inserted through the valve stem 21 to expand the seal member into sealing relation with the sides or passage of the recess 17 and against the shaft 16. When this seal is expanded by inflation against the shaft and the surfaces in the passages of the housing the shaft has to rotate in contact with the seal. By supplying a light pressure on the shaft and permitting a flow of clean liquid between the seal and the shaft, the same may be lubricated and will last for a long period of time, enough to bring a ship back to port under this standby seal.

The partition wall 19 separates the first expandable seal 18 from the second expandable seal 22 which is also one continuous tubular elastomer that is expandable in the recess or chamber passage 23 of the split annular housing 24 that is formed in two sections.

The partition wall 25 separates the expandable seal recess 17 from the seal chamber 26 which is open to the end of the split housing 1. The face 27 on the wall 25 forms an end of the chamber 26. The split gland member 28 closes the other end of the chamber and provides the annular sealing surface 30. The split gland member 28 is made up of two sections 31 and 32 bolted together by the bolts 33 and to the housing by the bolts 34. The gland member is provided with the outwardly extending radial flange 35 which mates with the flange 36 on the housing to which the stud bolts 34 are secured, an annular flange seal 37 is inserted between the flanges 35 and 36.

An annular groove 38 is placed in the bore of the gland member 28 to receive and direct any liquid through the passage 40 to the exterior of the split gland member where the liquid may be caught in a container or go to the bilge.

The annular seal members 41 and 42 are duplicates. The one to the left, seal 42, is a standby seal which can be changed when the seal 41 requires replacing. Each seal member is provided with a body section 43 that has one outwardly projecting flange 44, the outer face 45 of the seal 41 forms the mating sealing surface for annular sealing surface 30.

The sealing face 45 of each elastomer sealing surface is provided with two annular grooves 46 and 47 dividing the sealing surface into three annular surfaces or lands, 48, 50 and 51. The inner surface 48 forms an abutment to engage the sealing surface 30 if in the position of seal 41 or the next adjacent seal in the position of seal 42.

The abutment surface 48 is inward of the sealing surfaces 50 and 51 because the flange 44 normally extends axially outward when a free body.

The main sealing surface is the land 50 which is wider than the land 51. The land 50 has a turned-up edge or lip 52 which aids to seal this surface. Any pressure in the groove 47 is effective on this lip to seal the same. However, increased pressure in the annular groove will increase the flow past the smaller land 51 until the resistance to flow in that direction is greater than that past the surface 50 in which case some liquid flows radially in both directions.

Liquid is supplied to the groove 47 by the passage 53 which is connected to any suitable source of liquid, the pressure of which may be varied and controlled by the valve as shown.

The elastomer sealing elements 41 and 42 each have a shallow groove 54 in the perimetral surface of the body thereof to receive the garter springs 55. These garter springs tightly hold the sealing elements on the shaft causing them to rotate with the shaft. The pressure exerted on the flexible sealing elements by the garter springs is sufficient to prevent leakage along the shaft surface.

These sealing elements 41 and 42 are free to slide axially on the shaft without loss of contact with the sealing surface on the gland ring as the propeller shaft moves axially from a full forward to a full reverse thrust.

Referring specifically to the inflatable standby seals it will be shown in FIG. 1 that the seal member 18 has a chamber 56 for receiving the fluid under pressure through the valve 21 and is substantially rectangular in cross section but is provided with a shoe or shaft engaging sealing bore surface 57 which may be provided with spaced labyrinth grooves 58. The shoe 57 extends from the true rectangular cross section and is substantially as wide as the width of the passage forming the chamber 56 and is substantially as deep as the thickness of the inturned flanges 60 that form the undercut in the chamber 17. Thus the flanges 60 form a seat or offset for the inner surface of the inflatable packing member 18 to retain its sealing bore surface 57 spaced from the shaft 16. This cross-sectional undercut of course is formed through the tangential passage portion of the recess 17 that extends outwardly through the housing 1.

The seal member 22 is of course smaller in diameter as it simulates a seal of circular cross section having the inwardly extending shaft engaging shoe member 57 which is also retained by inwardly projecting offset or flanges 60. By reason of the fact that the inflatable standby seal 22 is smaller in diameter its connection as illustrated around the valve 21 in FIG. 1 is smaller in diameter than that of the seal member 18.

Figure 4:
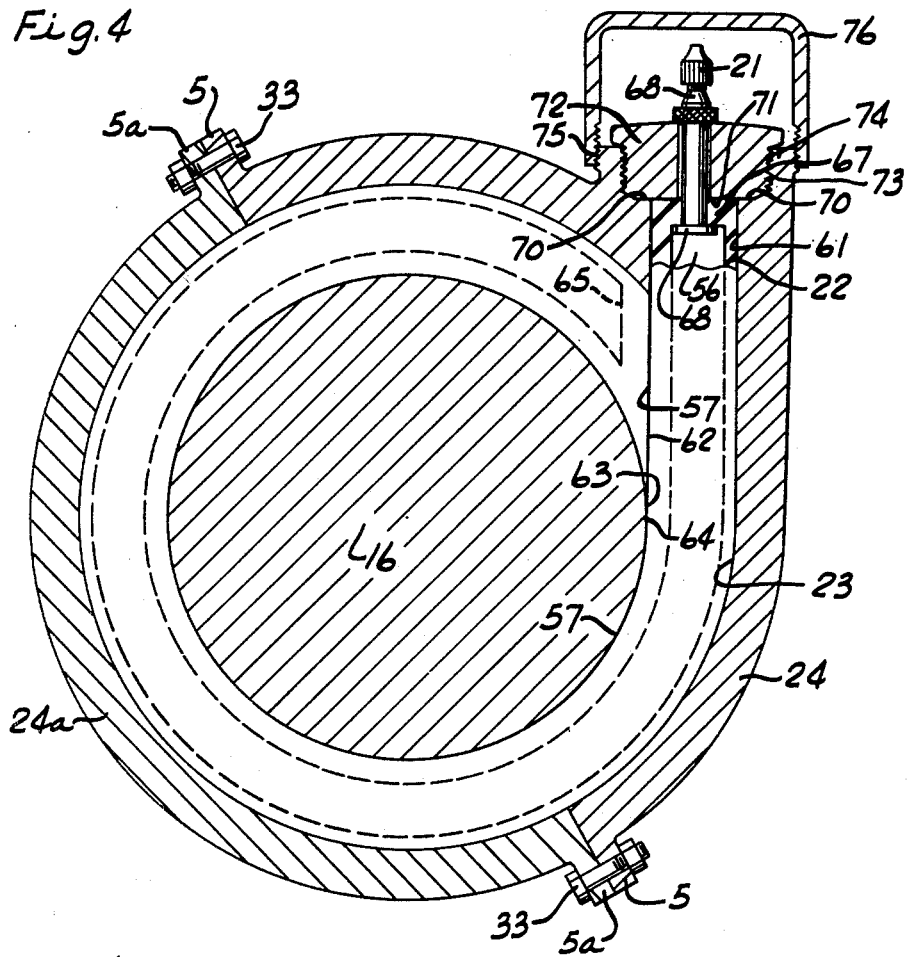
FIG. 4 is an end view of the seal in a housing shown in transverse section with the seal inflated against the shaft.

As shown in FIG. 4 the inflatable seal 22 is expanded against the shaft 16 and its sealing bore surface 57 tightly engages the surface of the shaft 16 and the whole of the chamber 23 is filled at the tangential point 61 where the seal is passing from the chamber 23 and the sealing bore surface 57 presses against the diagonal surface 62 of the end of the inflatable seal forcing it into tight sealing engagement with the shaft and overlapping the same where the point or apex 63 terminates at the same position as the sealing bore surface 57 engages the shaft from the tangential section of the inflatable seal which in this instance would be slightly before the true tangent point which may be indicated at 64 and would lie on the sealing bore surface 57 when the inflated seal member was not expanded.

The diagonal surface 62 is backed by a heavier wall 65 because of this lateral pressure.

As shown in FIG. 5 the single inflatable standby packing member 22 is replaced by two standby packing members which are the same in size and configuration and indicated at 22'. Here one may employ two short sections for the purpose of obtaining an inflatable seal rather than one long section as shown in FIG. 4. This structure has some advantage in that the short seal member is more readily applied in confined areas than the long seal member and if the shaft has a definite whip it may wear out one seal member at a greater rate than it would the other. However, the seal member functions in the same manner as that previously described and is shown in this view as being uninflated and illustrates the large clearance 66 between the surface of the shaft 16 and the sealing shoe surface 57.

Figure 3:
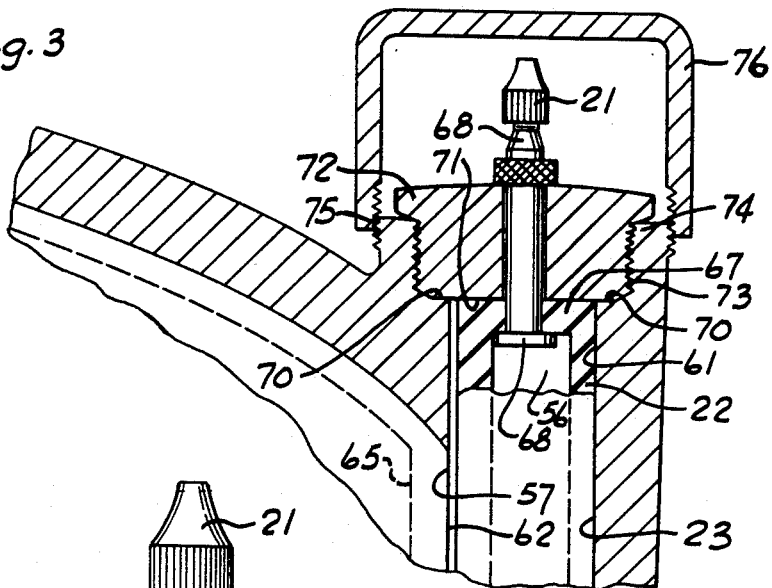
FIG. 3 is a transverse sectional view of the housing showing one form of inflatable packing seal.
Figure 8:
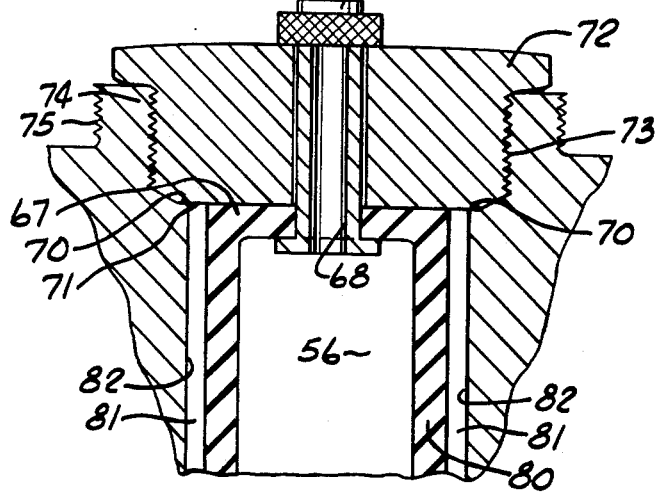
FIG. 8 is a sectional view of the valve section of the structure shown in FIG. 7.
Figure 6:
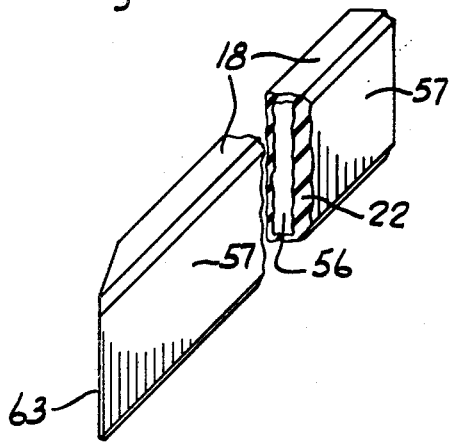
FIG. 6 is a perspective view of the valve end of a packing seal of rectangular cross section.

As best illustrated in FIGS. 3 and 8 each seal member has its outer or valve end provided with a plug 67 that is vulcanized in the end of the elastomer to close the chamber 56 and retain the stem 68 of the valve 21. This plug member does not change the interior shape of the inflatable seal nor the exterior shape as illustrated in FIG. 6. The housing is provided with a shoulder 70 to receive the under surface 71 of the threaded cylindrical cap or sleeve 72.

The threaded metal sleeve 72 is threadably received in the threaded bore 73 of the housing. This sleeve functions as a cap forming an exterior closure for the passage forming the annular chamber 23. The housing is required to extend as indicated at 74 from the annular surface following the tangential bore 61 so as to receive the exterior threads 75 on which is screwed the internally threaded closure cap or valve shield 76 which may also function as an exterior closure.

Figure 10:
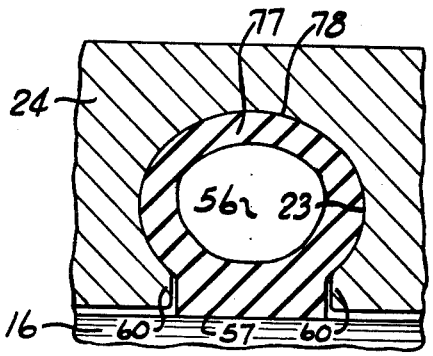
FIG. 10 is a transverse sectional view of a modified form of inflatable seal of circular cross section.

As illustrated in FIGS. 1 and 10 the flanges 60 which form the undercut or offset portion in the passage of the chambers 17 and 23 hold the sealing bore of the inflatable standby seal free of the shaft to provide the clearance 66 and these seals are deformed when inflated and are caused to expand and fill their respective chambers as well as to seal against the shaft 16. The inturned flanges 60 preferably form an offset or undercut that is no greater in depth than the actual thickness of the sides of the inflatable seal as shown in FIGS. 1 and 10. However, the structure as illustrated in FIG. 10 differs from that illustrated at 22 in that the inflatable seal member 77 is tapered being thicker adjacent the shoe sealing face 57 with its walls becoming progressively thinner to the point as illustrated at 78 remote of the shaft sealing face. This provides an increased flexibility permitting the seal to first readily seal in its chamber before causing any deformation of the shoe sealing surface and allows more flexibility in the deformation towards the shaft.

Figure 7:
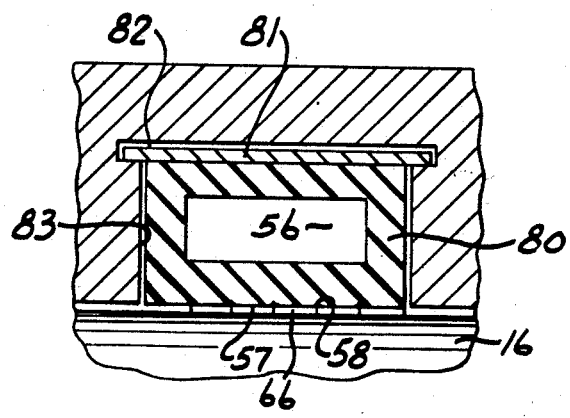
FIG. 7 is a cross-sectional view of an inflatable packing seal vulcanized to a flexible metal support.

In the structure illustrated in FIGS. 7 and 8 the seal member 80 is rectangular in cross section and has secured thereto the member 81 which may be a flexible metal such as stainless steel or a flexible metal covered strip or a flange made of rubber or plastic of denser material than that of the seal 80. These flanges preferably created by the member 81 extend beyond both sides of the seal 80 and formed integral therewith. The flanges formed by this member extend into the annular grooves or offsets 82 cut into the housing adjacent the perimetral surface of the passages forming the chamber and extend to the shoulder 70. The whole of the chamber which in this instance is indicated at 83 is sealed by the sides of the inflatable seal member expanding against the walls of the chamber. The opposed grooves 82 which follow the chamber to the shoulder 70 also represent an undercut such as formed by the inturned flanges 60 but is materially smaller and for the same purpose, namely for retaining the seal member 80 out of contact with the shaft when the seal is not in use.

I claim:

1. A fluid inflatable seal for engaging around an annular body extending out of a closure consisting of a housing having sealed attachment with the closure and provided with a bore therethrough for receiving the annular body, an annular chamber in said housing and having a passage surrounding said bore, means defining a continuous circumferential opening between said chamber passage and said bore, a lateral passage in said housing connected at its inner end to said chamber passage to form a continuous passage from the exterior of said housing into and around said chamber, a cap removably secured to said housing to close the exterior end of said lateral passage, and a relatively straight fluid expansible flexible seal member inserted from the exterior into and through said lateral passage and around said chamber passage to completely encircle and provide a sealing bore for the annular body, said seal member when expanded circumferentially sealing said passages and around the annular body in said bore.

2. The fluid inflatable seal of claim 1 characterized in that said lateral passage is tangent to said annular chamber passage and the inner end of said flexible seal member seals against itself at the juncture of said passages.

3. The inflatable shaft seal of claim 1 characterized in that said annular chamber passage and said lateral passage lie in a common transverse plane, and said lateral passage is tangent to said annular chamber passage.

4. The fluid inflatable seal of claim 1 which also includes an offset in the walls of said chamber and radially outwardly of said means defining a continuous circumferential opening.

5. The fluid inflatable seal of claim 4 characterized in that said offset is an annular recess to receive a portion of said seal member.

6. The fluid inflatable seal of claim 4 characterized in that said offset is on both sides of said passages and terminates at said means defining a continuous circumferential opening.

7. The inflatable shaft seal of claim 4 characterized in that the depth of said offset is substantially equal to the wall thickness of said seal member.

8. The inflatable shaft seal of claim 4 characterized in that said offset is an annular groove in said passages, and said seal member having a portion slidable into said annular groove to retain said sealing bore of said seal member retracted from said bore.

9. The inflatable shaft seal of claim 8 characterized in that said portion of the seal member in said annular groove is a flange integral with said seal member and extending axially outwardly on both sides thereof.

References Cited in the file of this patent

UNITED STATES PATENTS

| | | |
|---|---|---|
| 943,023 | Johnson | Dec. 14, 1909 |
| 1,439,452 | Shaw | Dec. 19, 1922 |
| 1,868,147 | Kruse | July 19, 1932 |
| 2,369,823 | Freed | Feb. 20, 1945 |
| 2,401,108 | Roberts | May 28, 1946 |
| 2,816,575 | Stokes | Dec. 17, 1957 |
| 2,822,192 | Beatty | Feb. 4, 1958 |
| 2,864,631 | Kemp | Dec. 16, 1958 |
| 2,943,874 | Valdi et al. | July 5, 1960 |
| 2,946,608 | Gilbert | July 26, 1960 |

FOREIGN PATENTS

| | | |
|---|---|---|
| 504,760 | Canada | Aug. 3, 1954 |